United States Patent [19]

Kim

[11] Patent Number: 5,000,055

[45] Date of Patent: Mar. 19, 1991

[54] DRIVING DEVICE OF THE SUN BLIND FOR USE IN AUTOMOBILES

[76] Inventor: Youngchol Kim, Sajic Royal Ap. 2 cha, 1-208, Sajic, 2-dong, Rep. of Korea

[21] Appl. No.: 416,600

[22] Filed: Oct. 3, 1989

[30] Foreign Application Priority Data

Oct. 7, 1988 [KR] Rep. of Korea .................. 16621

[51] Int. Cl.⁵ .................. B60J 7/057; F16H 37/06; F16H 19/04
[52] U.S. Cl. .................. 74/89.17; 74/665 H; 192/48.2; 192/48.8; 296/99.1
[58] Field of Search ........... 74/89.17, 665 H, 665 GE; 192/48.2, 48.8, 84 AA; 296/99.1, 95.1

[56] References Cited

U.S. PATENT DOCUMENTS

| 2,212,220 | 8/1940 | Zwierzina | 74/89.17 |
| 2,857,697 | 10/1958 | Schutt et al. | 74/89.17 X |
| 3,073,180 | 1/1963 | Lohr | 192/84 AA X |
| 3,266,328 | 8/1966 | Rott | 74/89.17 |
| 4,299,316 | 11/1981 | Reinmoeller | 74/665 GA X |
| 4,848,827 | 7/1989 | Ou | 296/99.1 |

FOREIGN PATENT DOCUMENTS

| 3146169 | 5/1983 | Fed. Rep. of Germany | 296/99.1 |
| 31682 | 3/1980 | Japan | 296/99.1 |
| 298500 | 10/1928 | United Kingdom | 296/95.1 |

*Primary Examiner*—Allan D. Herrmann
*Attorney, Agent, or Firm*—Notaro & Michalos

[57] ABSTRACT

A driving device for a sun blind comprises a base frame carrying a motor with speed reducer which drives four clutches that are individually operable. The clutches are connected between the base and a cover and are meshed with individual rack gears that each connect to a slider for sliding outwardly from under the cover.

4 Claims, 8 Drawing Sheets

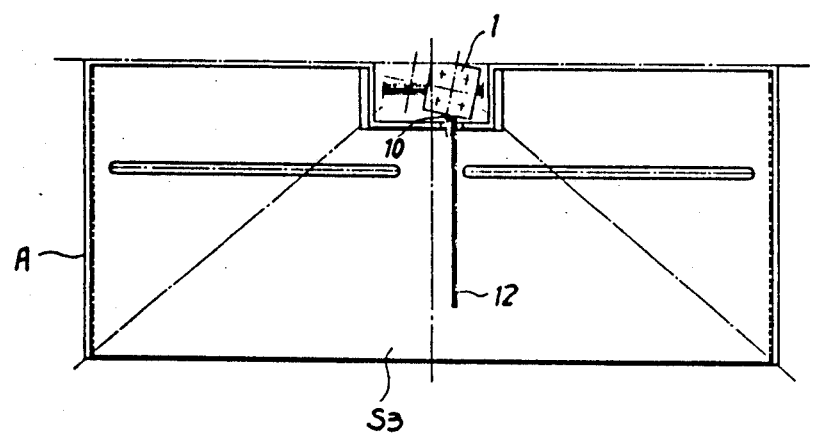
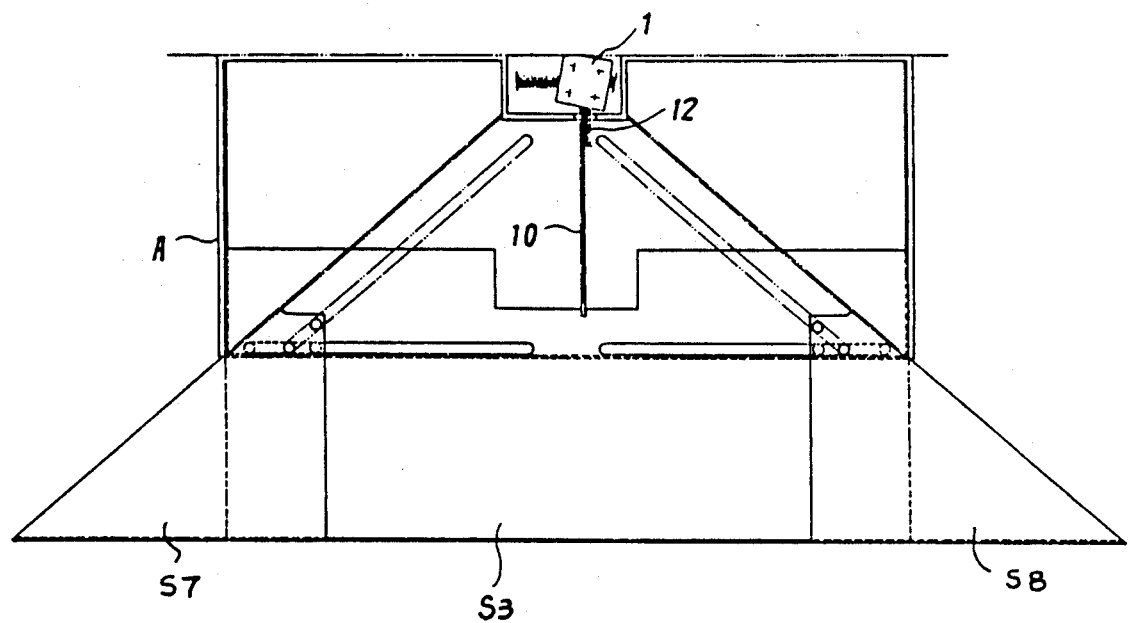

ure fixed
DRIVING DEVICE OF THE SUN BLIND FOR USE IN AUTOMOBILES

BRIEF DESCRIPTION OF THE DRAWINGS

FIGS. 7, 8, 9 and 10 are partial top plan views illustrating the operation of the sun blind.

Figure 1:
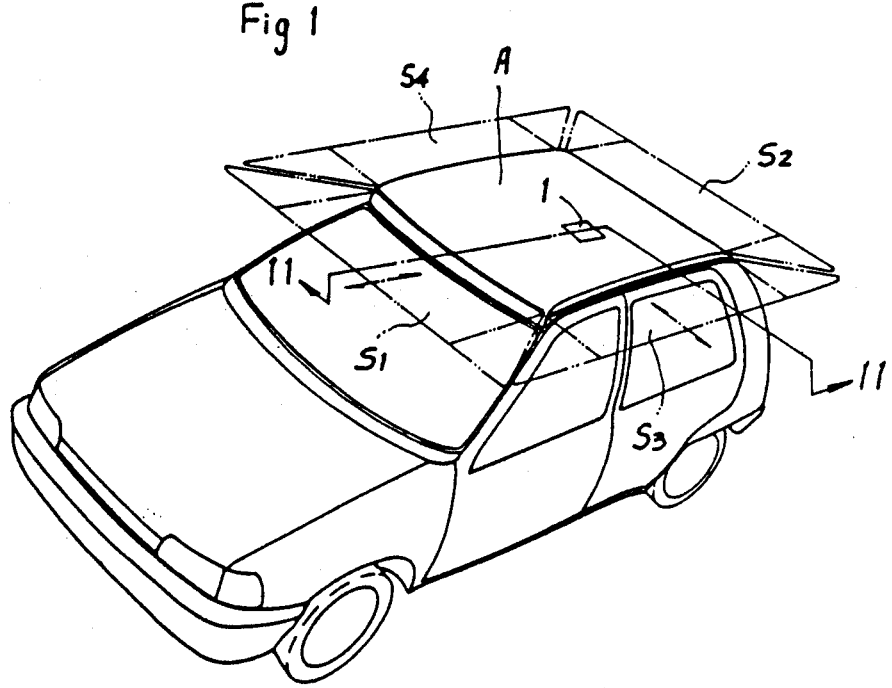
FIG. 1 is a perspective view illustrating a sun blind equipped with the present invention.

The following is a description of the symbols representing the major parts of the invention:

1: Cover
2: Speed reducer
3: Reversible motor
4: Base frame
5: Bracket
6: Clutch field assembly
6-1: Rotor assembly hub
6-2: Clutch amarture
6-3: Pinion gear
6-4: Bushing
6-5: Key
6-6: Bearing
6-7: Key
6-8: Bearing
6-9: Snap ring
6-10: Chain gear
6-11: Key
6-12: Snap ring
6-13: Shaft
7,9,10,12: Rack gears
7-1, 9-1, 10-1, 12-1: Slider holders
8-11: Sliding bars
13: Speed reducer chain gear
13-1: Chain
14: Middle frame
15: Lower frame
A: Sun blind
S1: Front slider
16: Screws
S2: Rear slider
S3: Left slider
S4: Right slider
S5, S6: Front corner slider
S7, S8: Side corner sliders
A1, B1, C1, D1: Single clutch assembly

DETAILED DESCRIPTION OF THE INVENTION

Figure 5:
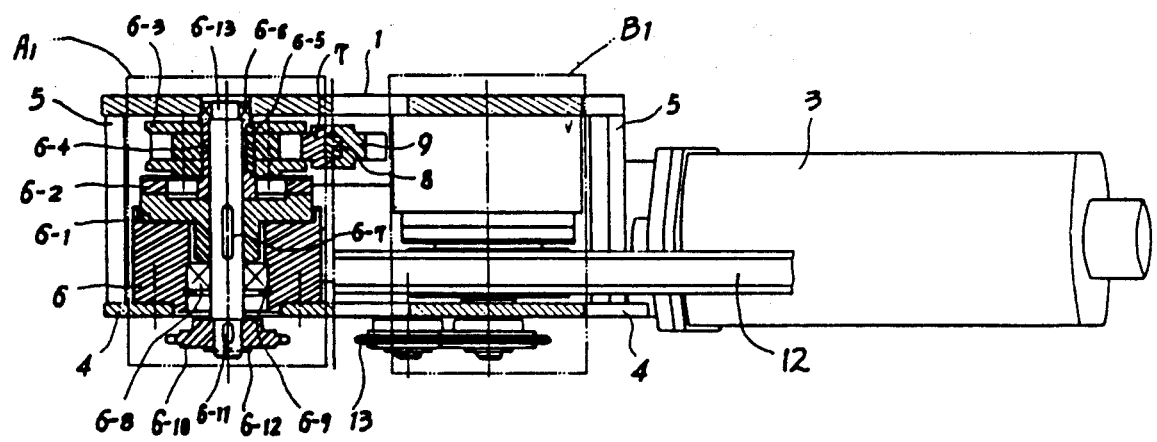
FIG. 5 is a cross-sectional view taken along line 5—5 of FIG. 2.
Figure 2:
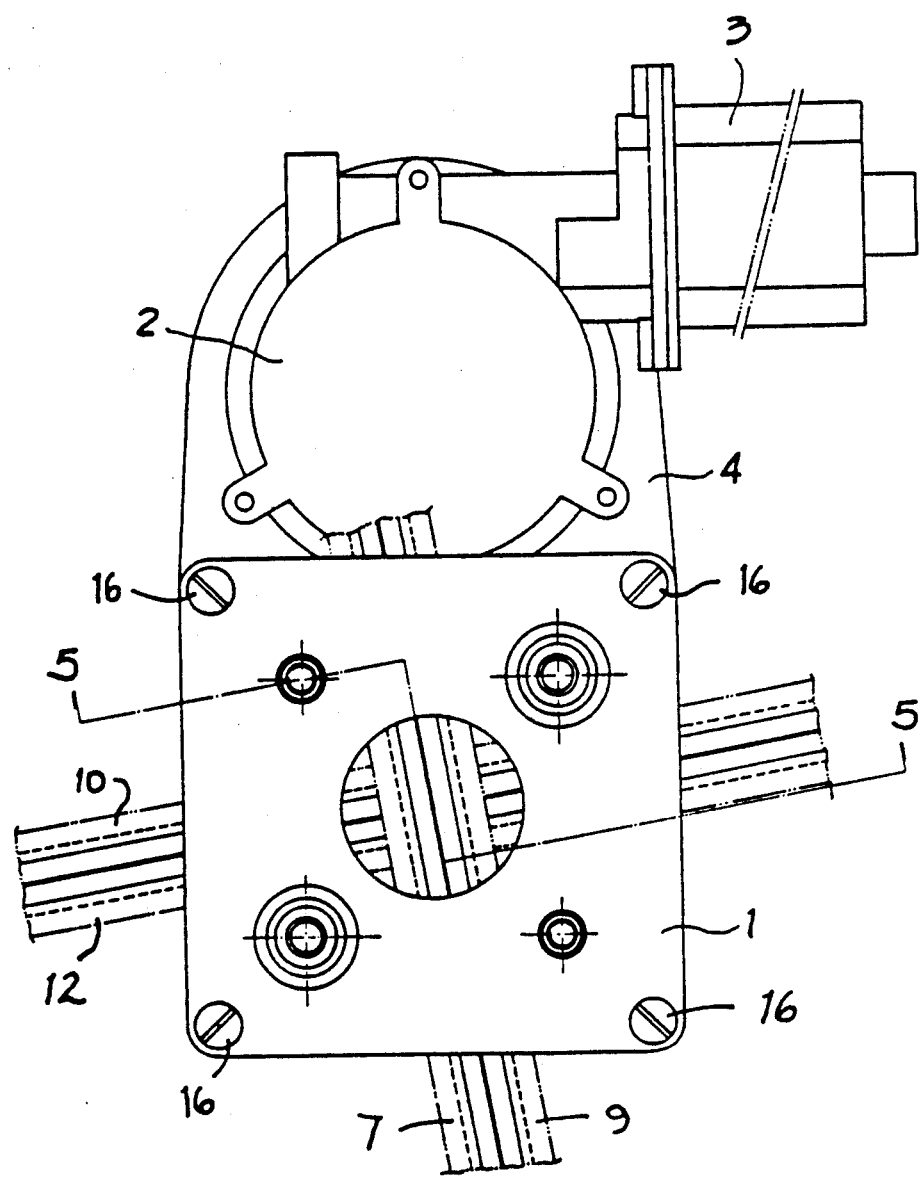
FIG. 2 is a plane view of the present invention.
Figure 3:
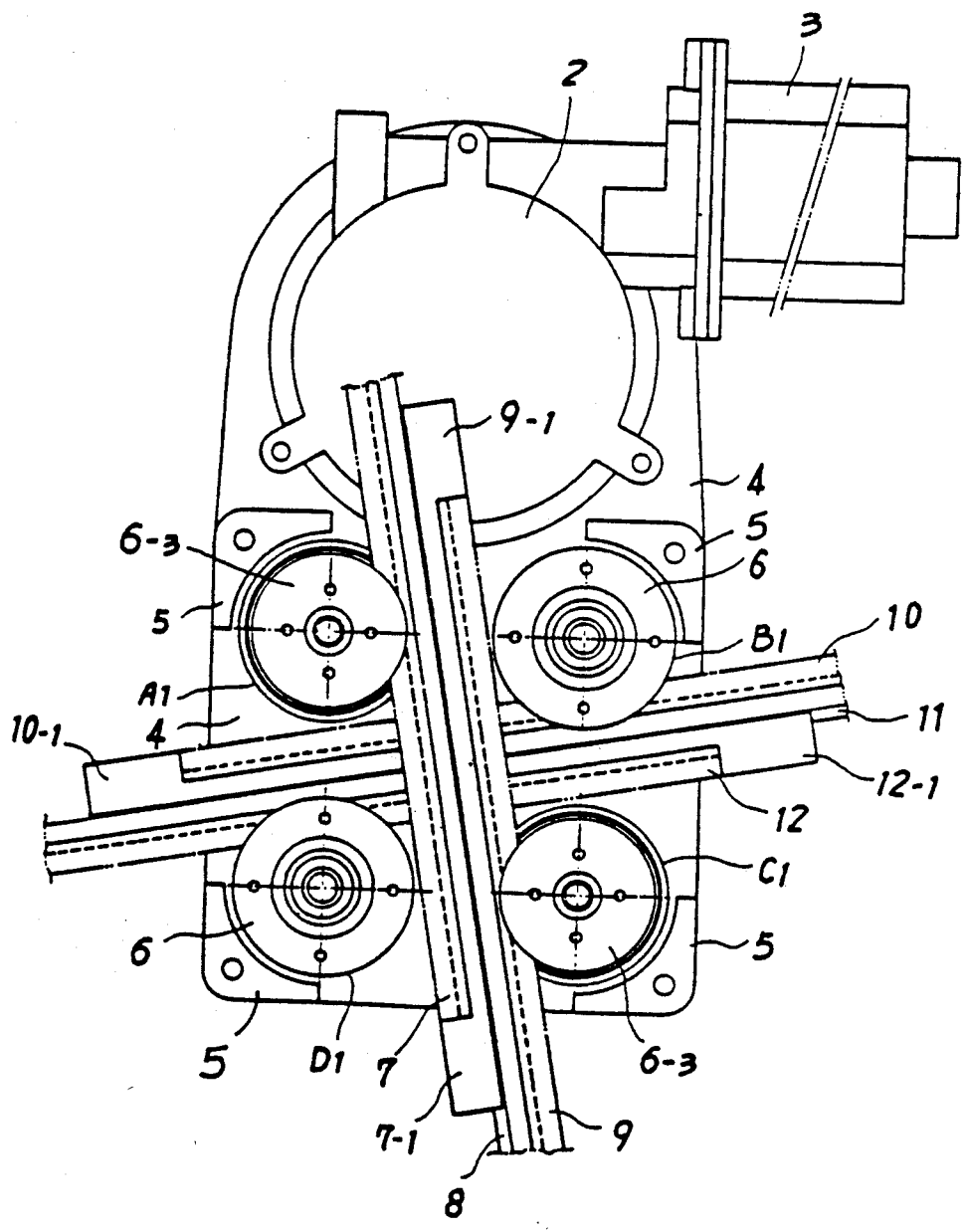
FIG. 3 is a plane view illustrating that a cover is separated from the present invention.
Figure 4:
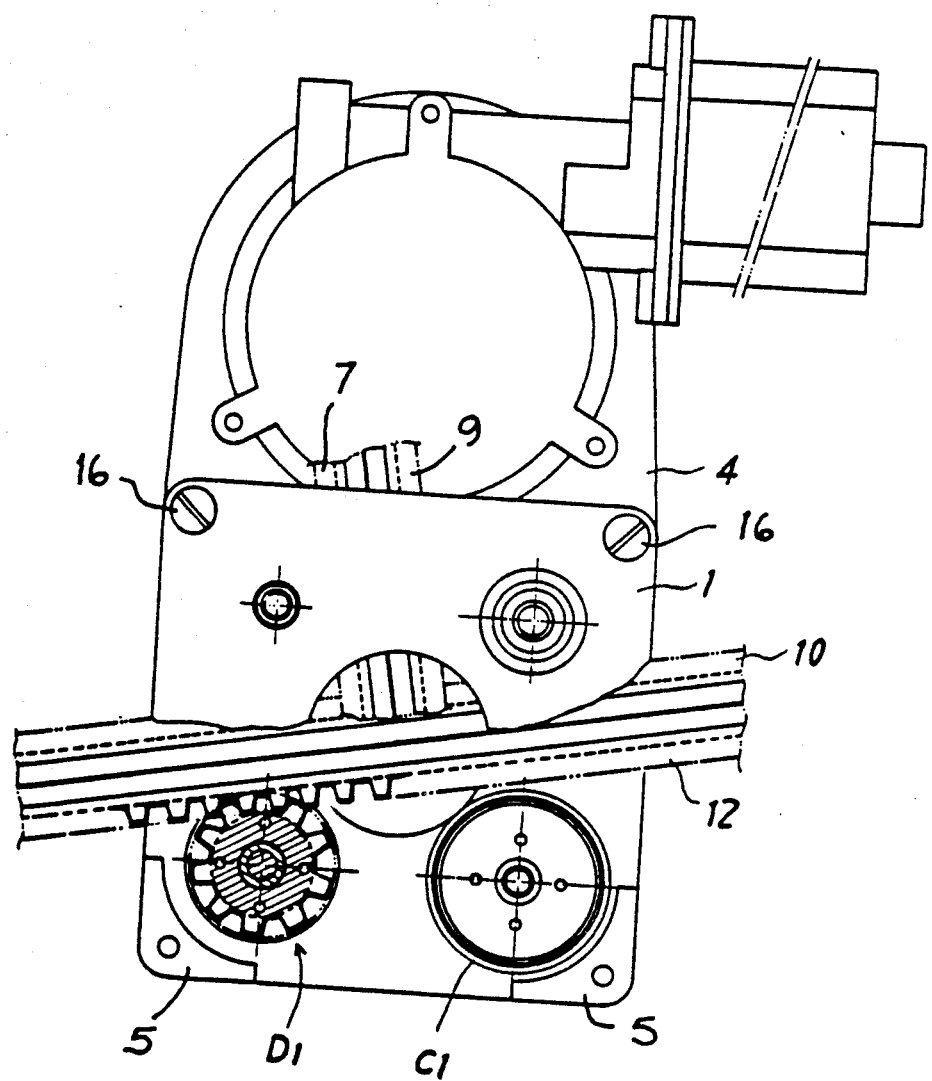
FIG. 4 is a cutaway view illustrating that a rack gear and a pinion gear are united in the present invention.
Figure 6:
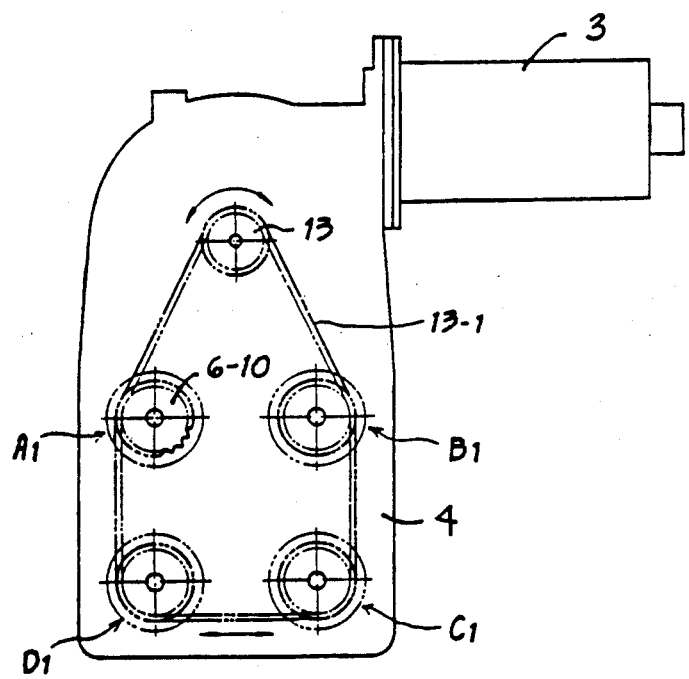
FIG. 6 is a sketchy view illustrating the power supply of the present invention.

The present invention relates to a driving device of a sun blind for installation on the roof of an automobile to lower its interior temperature during parking or running in the hot summer season Referring to the drawings attached hereto, the invention shown in FIGS. 2 to 6 comprises:

A motor (3) and a speed reduced (2) which are united and, as shown in FIG. 3. This unit installed on the one end of a base frame (4) having brackets (5) spaced as shown in FIG. 3 at an opposite end of base frame (4). As shown in FIG. 5, a clutch field assembly (6) is fixed to the base frame (4) as its base. After a rotor assembly hub (6-1) which is made of a shaft (6-13) and a key (6-7) is inserted thereinto and a busing (6-4) is pressed into the shaft (6-13), a pinion gear (6-3) integrated with a clutch armature (6-2) is assembled into the bushing (6-4) with a key (6-5). Then, a bearing (6-6) is fixed on an upper end of the shaft (6-13) and a bearing (6-8) is inserted into the clutch field assembly (6) and fixed with a snap ring (6-9). After a chain gear (6-10) is fixed on the upper end of shaft (6-13) with a key (6-11), it is made to be freely movable by being fixed with a snap ring (6-12). Clutches or single clutch assemblies A1, B1, C1 and D1 are fixed to the base frame (4) as shown in FIG. 3, between a cover (1) and the base frame (4) by screws or fasteners (16) which extend through brackets (5) at spaced locations on the base. Field assemblies (6) for clutches B1 and D1 are fixed to cover (1) and field assemblies (6) of clutches A1 and C1 are fixed to base frame (4) as shown in FIG. 5. After each rack gear (7, 9, 10, 12) having inserted sliding bars (8, 11) and a slider holder (7-1, 9-1, 10-1, 12-1) is constructed it is mounted in the drive as shown in FIG. 5, the rack gear (7) is meshed by a pinion gear 6-3 of the single clutch assembly A1. Similarly the rack gear (9) is meshed with the pinion gear of clutch C1, the rack gear (10) with in the pinion gear of clutch B1 and the rack gear (12) with the pinion gear of clutch D1 for free movement among the rack gears.

Operation of the present invention, is as follows:

Referring to a sun which was blind devised in a foreign country, it was mounted on the roof of a car and was so unshapely that it not only looks ill-formed externally but also caused air resistance. Also, it was too heavy to be put to good use and its driving device was impractical due to problems in preciseness and durability.

In the case of the present invention, however, it is contrived so as to be slim enough to meet with lesser air resistance, thereby looking fine externally, and so as to operate most efficiently and most precisely by enabling each of its sliders S1, S2, S3, S4, S5, S6, S7 and S8 to be driven independently but simultaneously.

The power which is supplied through the motor (3) and the speed reducer (2) when connected to a power source, is supplied to the chain gear (6-10) of clutches A1, B1, C1 and D1 by way of the chain gear (13) of the speed reducer (2) and through a chain (13-1), and the shaft (6-13) of clutches A1, B1, C1 and D1 turns only the rotor assembly hub (6-1) which runs idly.

At this time, the slider (S1) in front is connected to the slider holder (9-1), the slider (S2) in the rear is connected to the slider holder (7-1), the slider (S3) on the left is connected to the slider holder (10-1) and the slider (S4) in the right being with the slider holder (12-1).

Figure 7:
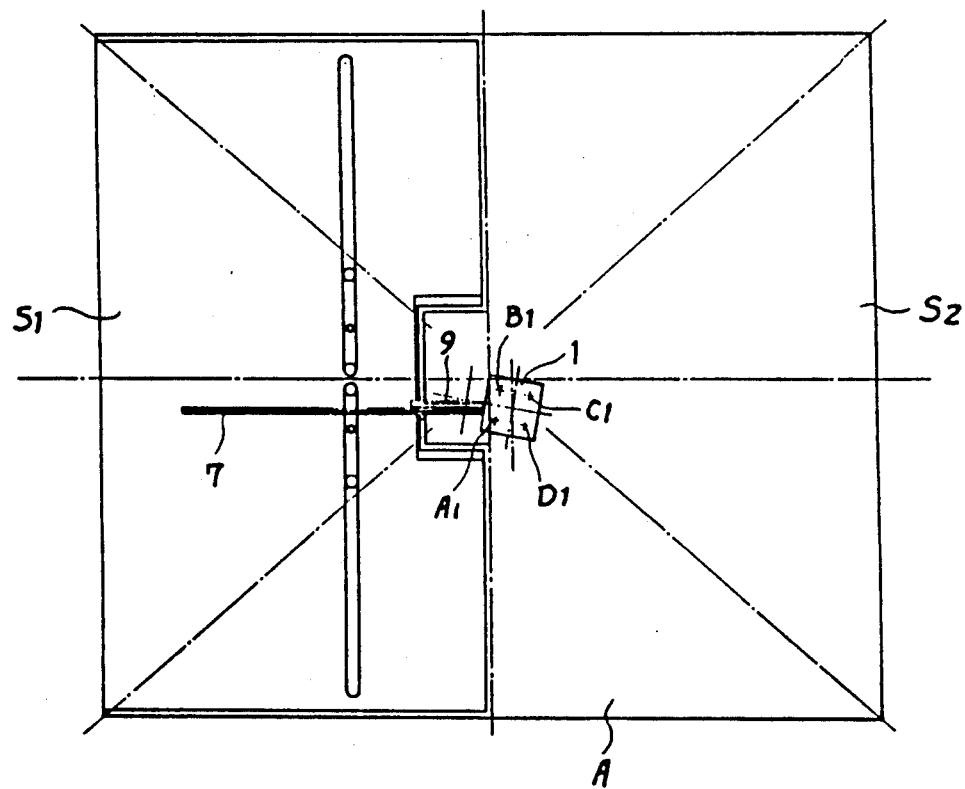

As shown in FIG. 7, when front slider (S1) is in its retracted position, rack (9) is also retracted to the right. Similarly rack (7) which is connected to rear slider (S2) is retracted all the way to the left in FIG. (7).

Figure 8:
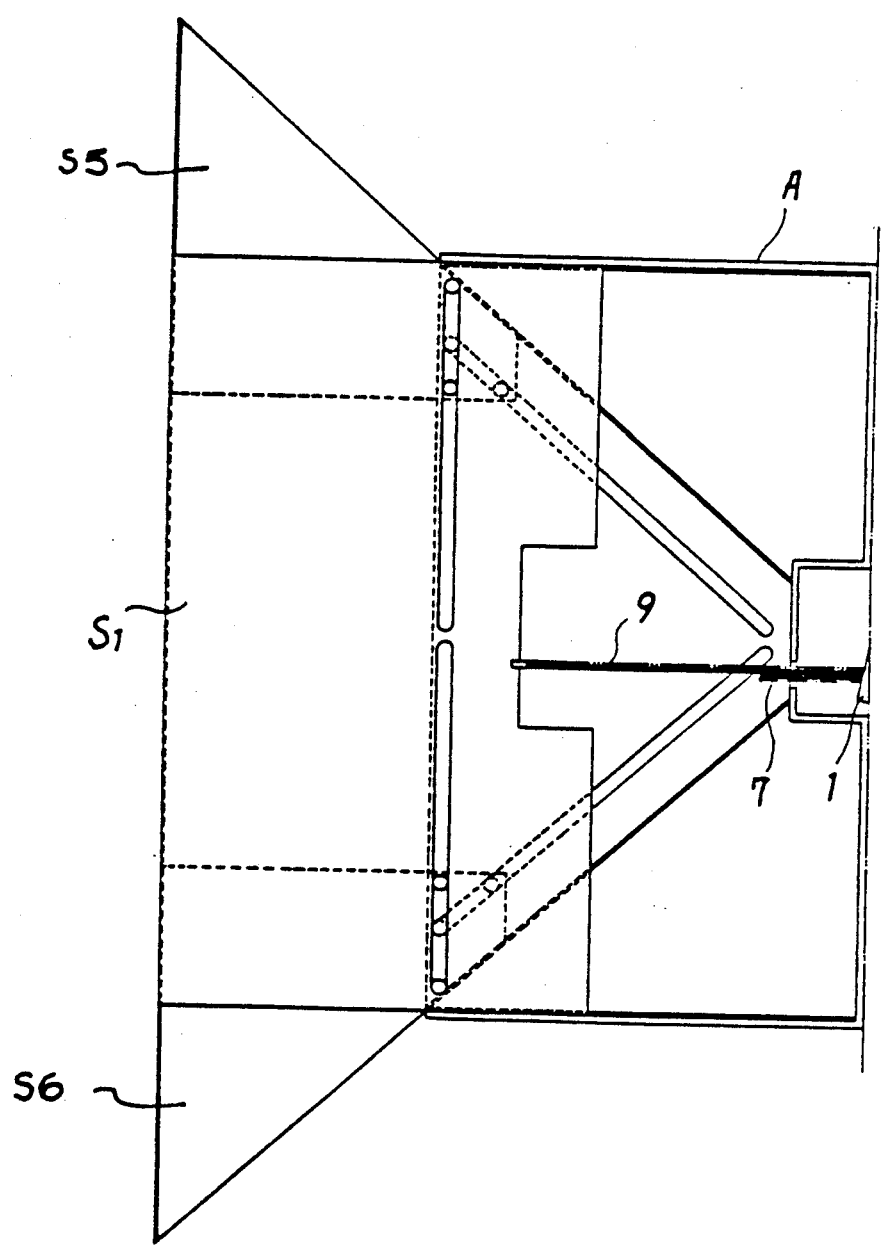
Figure 11:
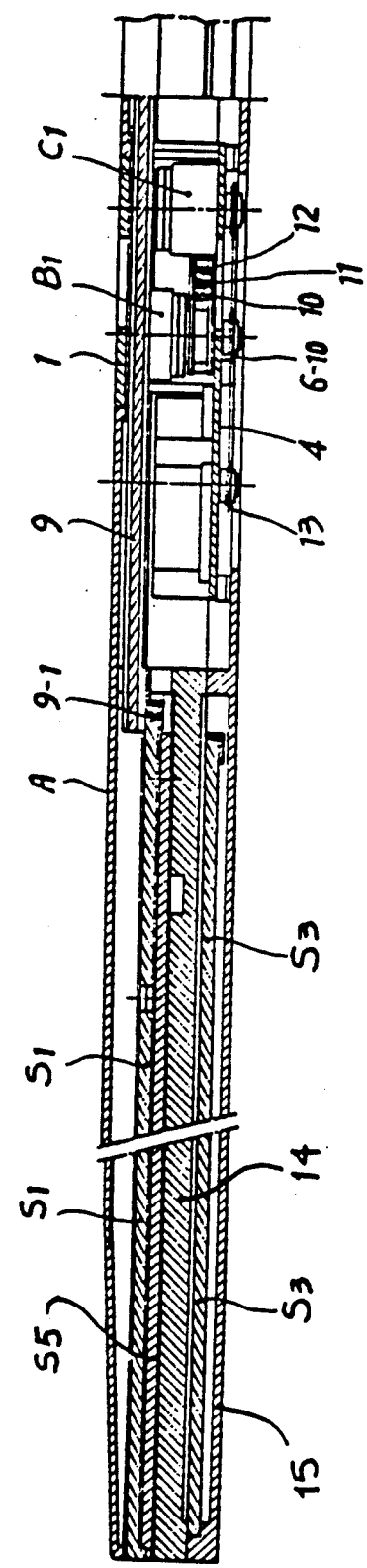
FIG. 11 is a cross-sectional view taken along line 11—11 of FIG. 1.

As shown in FIG. 8, when rack (9) is moved to the left, it extends front slider (S1) and a pair of corner sliders (S5) and (S6) which are interconnected in a manner not shown to front slider (S1).

FIG. 9 shows the retracted position for side slider (S3) with its rack (10), and the opposite side slider with its rack (12) which is retracted to the left.

FIG. 10 shows side slider (S3) with its corner sliders (S7) and (S8) extended freely with the extended rack (10). One end of the now extended rack (12) is also visible in FIG. 10.

Thus, in order to use those sliders (S1, S2, S3, S4) by operating them simultaneously and by drawing them out from the sun blind (A) power must be supplied to the clutch field assemblies (6) of A1, B1, C1 and D1. When power is supplied thereto, those clutch field assemblies are strongly connected with the rotor assembly hub (6-1) in which all its clutch armatures (6-2) are rotating, and turn all the pinion gears (6-3) which are united. Then, each slider is thereby made to jut out from the sun blind.

In addition, when power is selectively supplied to the clutch assemblies, each slider (S1, S2, S3, S4) is selectively made to jut out from the sun blind independently.

Regarding the composition of rack gears which is the main characteristic of this invention, each gear (7) (9) (10) (12) serves as a guide by being provided with slide bars (8) (11), so that the driving device can be made small. Moreover, the action and reaction of force during operation is offset by composing each single clutch assembly (A1, C1, B1, D1 diagonally, as shown in FIG. 3, so that the driving device can operate without the smallest strain.

Consequently, the present invention is a driving device contrived for use in operating most preciously and most efficiently an automobile sun blind used to interrupt sunlight or rain.

What is claimed is:

1. A driving device for a sun blind for use on automobiles, comprising:
   a base frame (4) having a plurality of brackets (5) spaced thereon and extending upwardly therefrom;
   a motor (3) with speed reducer (2) connected to said base frame;
   first, second, third and fourth clutch (A1, B1, C1, D1) mounted at spaced locations to said base frame;
   a cover (1) connected by fasteners extending through said brackets, to said base frame with said clutches between said base frame and said cover;
   each of said clutches comprising a clutch field assembly (6), a rotor hub (6-1) with a shaft (6-13) and a key (6-7) connecting said shaft to said hub, said hub being engaged for rotation in said field assembly, a bushing (6-4) pressed to said shaft and a pinion gear (6-3) having an integrated clutch armature (6-2), connected to said shaft by a further key (6-5) at said bushing, a bearing (6-6) engaged with an end of said shaft which is opposite from said field assembly, said field assembly of each clutch being fixed to one of said cover and base frame and said bearing of each clutch being fixed to the other of said cover and base frame for rotatably mounting said pinion gear on said base frame, each clutch having a chain gear (6-10) connected to said shaft by an additional key (6-11);
   first, second, third and fourth rack gears (7, 9, 10, 12);
   a first sliding bar (8) slidably engaged between said first and second rack gears for slidably mounting said first and second rack gears to each other, said first rack gear being meshed with the pinion gear of said first clutch and said second rack gear being engaged with the pinion gear of said third clutch;
   a second slide bar (11) slidably engaged between said third and fourth rack gears for slidably mounting said third and fourth rack gears to each other, said third and fourth rack gears extending substantially transversely to said first and second rack gears, said third rack gear being meshed with the pinion gear of said second clutch and said fourth rack gear being meshed with the pinion gear of said fourth clutch, said clutches being independently operable for independently moving said first, second, third and fourth rack gears when said pinion gears are rotated; and
   a chain (13-1) connected with each chain gear and with said speed reducer for rotation of each pinion gear with operation of said motor.

2. A driving device according to claim 1, including a snap ring (6-9) for holding said shaft to said field assembly and a further snap ring (6-12) for holding said chain gear to said shaft, for each of said clutches.

3. A driving device according to claim 1, wherein said clutches are mounted in a square pattern, the field assembly of said first and third clutches being fixed to said base frame and the field assembly of said second and fourth clutches being fixed to said cover.

4. A driving device according to claim 1, including a slider holder connected to each rack gear for connecting each rack gear to a respective sun blind slider.

* * * * *